United States Patent [19]
Ogata et al.

[11] Patent Number: 5,617,545
[45] Date of Patent: Apr. 1, 1997

[54] ARBITRATION CIRCUIT CAPABLE OF CHANGING THE PRIORITY AND ARRIVAL TIME OF NONSELECTED REQUESTS

[75] Inventors: Yasuhiro Ogata, Akishima; Shigeo Takeuchi, Hanno; Taturu Toba; Shinichi Shutoh, both of Hadano; Naoki Hamanaka, Tokyo, all of Japan

[73] Assignees: Hitachi, Ltd.; Hitachi VLSI Engineering Corporation, both of Tokyo, Japan

[21] Appl. No.: 73,075

[22] Filed: Jun. 9, 1993

[30] Foreign Application Priority Data

Jun. 10, 1992 [JP] Japan ............................ 4-150390

[51] Int. Cl.$^6$ ........................................ G06F 13/18
[52] U.S. Cl. ............................ 395/296; 395/293
[58] Field of Search ........................ 395/325, 293, 395/296

[56] References Cited

U.S. PATENT DOCUMENTS

| 4,375,639 | 3/1983 | Johnson, Jr. ............... 340/825.5 |
|---|---|---|
| 4,536,839 | 8/1985 | Shah et al. ..................... 395/425 |
| 4,814,974 | 3/1989 | Narayanan et al. ............. 395/725 |
| 5,195,185 | 3/1993 | Marenin ........................ 395/325 |
| 5,317,696 | 5/1994 | Hilgendorf .................... 395/325 |

FOREIGN PATENT DOCUMENTS 3152657  6/1991  Japan ..................... G06F 15/16

*Primary Examiner*—Jack B. Harvey
*Assistant Examiner*—Jeffrey K. Seto
*Attorney, Agent, or Firm*—Antonelli, Terry, Stout & Kraus, LLP

[57] ABSTRACT

A parallel computer network wherein an arbitration circuit for performing arbitrating operation over a plurality of processing requests at the same time at high speed is provided in a crossbar network control circuit to thereby prevent the processing requests not selected from being kept awaited for a long time. The arbitration circuit includes a priority bit change circuit which has a plurality of adders for adding a preset value to the priority information of the each awaited processing request and also has a plurality of comparators for detecting the requests being awaited.

8 Claims, 3 Drawing Sheets

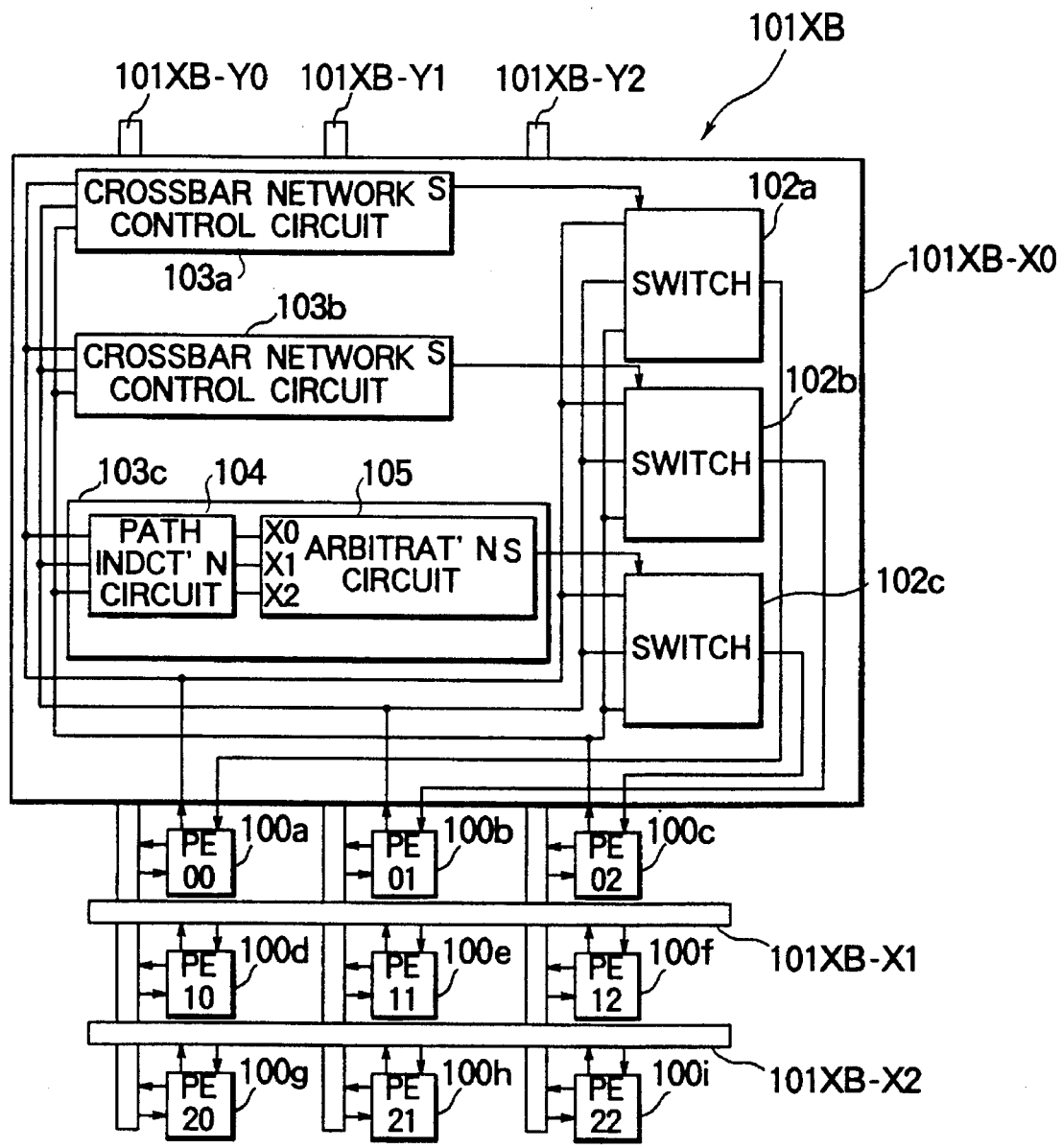

FIG. 4

|  |  | FIRST | SECOND | THIRD | FOURTH |
|---|---|---|---|---|---|
| PE0 | PRIORITY BIT | 100 | 100 |  |  |
|  | ARRIVAL TIME | 100 | 100 |  |  |
| PE1 | PRIORITY BIT | 011 |  |  |  |
|  | ARRIVAL TIME | 101 |  |  |  |
| PE2 | PRIORITY BIT | 100 | 100 | 100 |  |
|  | ARRIVAL TIME | 100 | 100 | 100 |  |
| PE3 | PRIORITY BIT |  | 101 | 101 | 101 |
|  | ARRIVAL TIME |  | 011 | 011 | 011 |

FIG. 5

|  |  | FIRST | SECOND | THIRD | FOURTH |
|---|---|---|---|---|---|
| PE0 | PRIORITY BIT | 100 |  |  |  |
|  | ARRIVAL TIME | 100 |  |  |  |
| PE1 | PRIORITY BIT | 011 | 011 | 011 | 011 |
|  | ARRIVAL TIME | 101 | 101 | 101 | 101 |
| PE2 | PRIORITY BIT | 100 | 100 | 100 |  |
|  | ARRIVAL TIME | 100 | 100 | 100 |  |
| PE3 | PRIORITY BIT |  | 101 |  |  |
|  | ARRIVAL TIME |  | 011 |  |  |

FIG. 6

|  |  | FIRST | SECOND | THIRD | FOURTH |
|---|---|---|---|---|---|
| PE0 | PRIORITY BIT | 100 |  |  |  |
|  | ARRIVAL TIME | 100 |  |  |  |
| PE1 | PRIORITY BIT | 011 | 100 | 101 |  |
|  | ARRIVAL TIME | 101 | 101 | 101 |  |
| PE2 | PRIORITY BIT | 100 | 101 |  |  |
|  | ARRIVAL TIME | 100 | 100 |  |  |
| PE3 | PRIORITY BIT |  | 101 | 110 | 111 |
|  | ARRIVAL TIME |  | 011 | 011 | 011 |

ARBITRATION CIRCUIT CAPABLE OF CHANGING THE PRIORITY AND ARRIVAL TIME OF NONSELECTED REQUESTS

CROSS-REFERENCE TO RELATED APPLICATION

The application relates to U.S. patent application Ser. No. 07/916,630 filed on Jul. 22, 1992 entitled "PARTIAL BROADCAST METHOD IN PARALLEL COMPUTER AND A PARALLEL COMPUTER SUITABLE THEREFOR", by Yasuhiro OGATA, et al and assigned to Hitachi, Ltd., and Hitachi VLSI Engineering Corporation.

BACKGROUND OF THE INVENTION

The present invention relates to a data processor system and more particularly, to an arbitration circuit which is suitably used when a plurality of requesters demand one object at the same time.

This type of arbitration circuit has conventionally employed a fixed priority system or an arrival order system. Another similar system is disclosed in JP-A-3-152657.

The above patent application is directed to a multi-processor memory request control system which comprises a plurality of processors provided as spaced by different distances from a memory shared by the plurality of processors, and wherein the respective processors can have a constant access time to the memory regardless of the distances from the memory.

In this technique, a selection circuit incorporating the above arbitration circuit sequentially selects the memory requests of the processors on an alternative basis in the ascending order of distance of the processors from the memory to obtain the eventual memory request. When the selection circuit uses an arbitration system for selecting the memory requests merely in the arrival order, the memory request of the processor farther located from the memory is more often alternatively selected than the memory request of the processor less farther located, which results in that the processor located closer to the memory can make access to the memory more quickly without being awaited. In addition, the memory request of the processor located farther from the memory can arrive at the memory only after a longer time. As a result, when the above two factors are considered, the processor farther located from the memory will have a much longer access time.

In the above technique, priority information for controlling the selection order in the selection circuit is attached to the memory request and further the arbitration is carried out in the following manner.

(1) The arbitration circuit compares the non-selection memory request (which is being awaited because the buffer of a next-stage selection circuit is full) already arrived at the selection circuit with a memory request newly arrived thereat with respect to the priority information of the requests, and according to the magnitude of the priority information, selects and determines one of the memory requests to be next selected regardless of their arrival time.

(2) The priority information of the memory request is added by a predetermined value to increase the priority each time the memory request is selected at the selection circuit.

(3) The priority information of the memory request not selected through the arbitration is also added by a predetermined value to increase the priority for the next arbitration.

In this system, thus, the memory request of the processor farther located from the memory may have a higher priority as the memory request comes closer to the memory through the above operation (2) and may be selected faster than the memory request of the processor located closer to the memory through the operation (1). Further, even when a series of the memory requests are issued from the processors farther located to the memory, since the memory request of the processor located closer thereto is increased in its priority through the operation (3) each time the request fails to be selected, whereby the memory request can be selected relatively soon. In this way, the aforementioned system enables the access times of the respective processors to the memory to be made substantially constant regardless of the distances of the processors to the memory.

The arbitration method above, however, is defective in that the memory requests of two of the plurality of processors are sequentially selected on alternative basis, which undesirably requires the increase of the number of selection parts in proportion to the number of such processors, and further in that the selection parts are connected in series, which undesirably requires a long processing time resulting from the necessity of the arbitration of all the processors.

SUMMARY OF THE INVENTION

It is an object of the present invention to provide a data processor system which comprises an arbitration circuit for suitably performing an arbitrating operation at high speed over a plurality of processing requests received from a plurality of processors located at an equal distance from a memory, thus preventing a request needing immediate processing from being awaited for a long time.

In order to achieve the above object, an arbitration circuit includes a holding device adding a request signal priority information for judging whether a result indicates a selection state or not in response to comparison the request signal priority information of a request signal with that of another request signal to the request signal when arbitrating in the arbitration circuit, for holding arrival order information indicative of the order of arriving the request signal at the arbitration circuit at every request signal; a selection device selecting a request signal having the highest-priority request signal among other request signals which are not selected yet in arbitrating, in the case that the request signal having the same priority information is present in plural, comparing each of the arrival order information held in the holding device to thereby select one of the highest-priority request signals arrived at first; and modifying device for modifying the priority information of a request signal which is not selected in spite of having that the arrival order is earlier than the selected request signal from a result of the arbitration to a higher priority in the following arbitration.

BRIEF DESCRIPTION OF THE DRAWINGS

FIG. 1 is an arrangement of a parallel computer in accordance with an embodiment of the present invention;

FIG. 2 is a format of a message used in the embodiment of the present invention;

FIG. 4 is a table showing an arbitration result based upon an arrival order.

FIGS. 5 and 6 are tables showing arbitration results based upon the arbitration circuit embodiments of the present invention.

DESCRIPTION OF THE PREFERRED EMBODIMENTS

Figure 3:
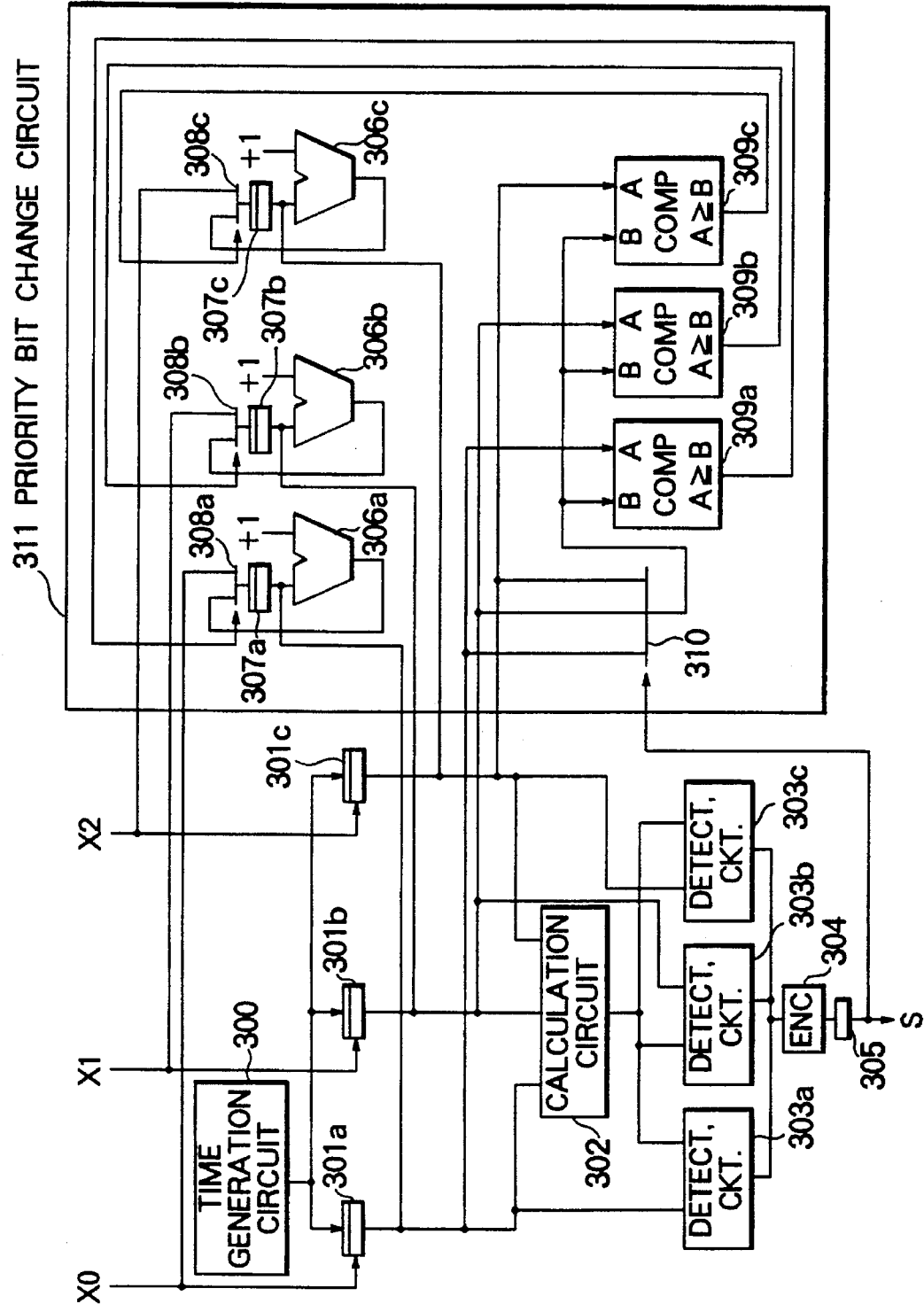
FIG. 3 is an arrangement of a path indication circuit in FIG. 1.

The present invention will be described with reference to the accompanying drawings showing an embodiment of the present invention. In the present specification, explanation will be made in conjunction with a network arbitration circuit for a parallel computer which performs high speed data transfer between a plurality of processors.

FIG. 1 shows a general arrangement of a parallel computer, in which reference symbols 100a to 100i denote processors (which will be sometimes referred to merely as the PEs, hereinafter) and symbol 101XB denotes a crossbar network. In the illustrated example, the crossbar network 101XB includes 3 crossbar networks 101XB-X0, 101XB-X1 and 101XB-X2 arranged in an X direction and 3 crossbar networks 101XB-Y0, 101XB-Y1 and 101XB-Y2 arranged in a Y direction. The number of such crossbar networks, however, is given as an example and thus is not limited to the specific value. Accordingly, even when the crossbar network 101XB is arranged in a three dimensional form or in a multi-stage form, it will be easily realized. Since the crossbar network 101XB has 3 input and output ports respectively, each of the crossbar networks 101XB-X0, 101XB-X1 and 101XB-X2 is made up of 3 switches 102a to 102c and 3 crossbar network control circuits 103a to 103c. Further, each of the crossbar network control circuits 103a to 103c is made up of a path indication circuit 104 and an arbitration circuit 105. The path indication circuit 104 functions to determine the output destination of a received message. For example, the path indication circuit 104 of the crossbar network control circuit 103c judges through the switch 102c whether or not the received message is output to the processor 100c (PE02). If crossbar network control circuit 103c determines that the received message is to be output to the processor 100c, then the circuit informs the arbitration circuit 105 of a transmission request. The arbitration circuit 105 mediates or arbitrates between the messages received from three associated processors PEs and in the illustrated example, the arbitration is determined according to priority bits attached to the messages. When the priority bits are the same, the first arrived message becomes preferential; while when the messages with the same priority bit arrive at the same time, the arbitration is determined according to a predetermined fixed priority.

Shown in FIG. 2 is a message format which includes a transmission PE number, a reception PE number, and a CTL bit including a predetermined priority bit.

FIG. 3 shows an arrangement of the arbitration circuit 105 which receives the priority bit in the message and a transmission indication signal for the message generated by the path indication circuit 104. The arbitration circuit 105 includes a relative time generation circuit 300 for generating arrival times, registers 301a to 301c for holding the arrival times, maximum calculation circuit 302 for calculating maximum values of the arrival times and priority bits, coincidence check circuits 303a to 303c for detecting coincidences between the maximums and associated arrival time and priority bit, a priority encoder 304, and a register 304 for holding the number of the selected message. Also included in the arbitration circuit 105 is a priority bit change circuit 311 which changes the priority bits of the waiting messages. More specifically, the priority bit change circuit 311 further has adders 306a to 306c for incrementing the priority bit by +1, registers 307a to 307c for holding their priority bits therein, selection circuits 308a to 308c for selecting either one of the priority bit incremented by +1 and the priority bit in the message, comparators 309a to 309c for comparing the arrival time of the selected message with the other arrival times of the other messages to check whether or not the associated message is to be awaited, and a selection circuit 310 for selecting one of the arrival times corresponding to the selected message.

Explanation will next be made in connection with an example where, in the parallel computer shown in FIG. 1, it is desired to transfer a data from the processor 100a (PE00) to the processor 100i (PE22). It is assumed in this example that the message is sent in the X direction and then in the Y direction. When it becomes necessary to transfer the data from the processor 100a (PE00) to the processor 100i (PE22) during execution of a program, the processor 100a (PE00) generates a message and transmits it to the crossbar network 101XB-X0. At this time, the processor 100a (PE00) as a message sender adds a priority bit in the message. In other words, the priority bit is previously attached to the message to be transferred in order that the message required to be quickly transferred should be preferential. For example, when a failure takes place and thus it becomes necessary to inform all the processors 100a to 100i quickly of the failure, the selection possibility of the arbitration circuit 105 can be made high by previously making high the priority. In the crossbar network 101XB-X0, the path indication circuit 104 determines the transfer route of the message on the basis of the reception PE number and CTL bit in the message. More specifically, the path indication circuit 104 of each of the crossbar network control circuits 103a to 103c judges whether the associated message is to be output from associated one of the switches 102a, 102b and 102c. When determining to output the message from the switch 102a, 102b or 102c, the associated path indication circuit 104 sends the transmission indication signal and priority bit to the associated arbitration circuit 105. The arbitration circuit 105 receives at its inputs X0, X1 and X2 the transmission indication signals and priority bits of the messages from the processors 100a (PE00), 100b (PE01) and 100c (PE02), respectively. The arbitration circuit 105 determines, on the basis of the transmission indication signals and priority bits from the path indication circuit 104, the priority of the message transmission; changes the switches 102a, 102b and 102c connected to outputs of the crossbar network 101XB-X0; and sends the message to the processor (PE) as its receiver. In this case, more specifically, the message issued from the processor 100a (PE00) is judged by the path indication circuit 104 of the crossbar network control circuit 103c to be a message to be output from the switch 102c, subjected at the arbitration circuit 105 to a message arbitration, and then sent to the processor 100c (PE02) from the switch 102c.

Next, explanation will be made as to how the arbitration circuit 105 of FIG. 3, when receiving a plurality of messages, arbitrates therebetween. More in detail, when messages are input to each of the crossbar network control circuits 103a to 103c from the 3 processors and the each path indication circuit 104 judges that the messages should be output from their own switches 102a, 102b and 102c; the path indication circuit 104 sends the transmission indication signal and priority bit to the associated arbitration circuit 105. In the arbitration circuit 105, the transmission indication signal causes arrival times of the messages to be set in the register 301a, 301b and 301c so that the priority bits attached to the messages are set in the registers 307a, 307b and 307c of the priority bit change circuit 311 respectively. And combinations of the priority bits as upper digits and bits indicative of the arrival times as lower digits are applied to the maximum value calculation circuit 302 which in turn finds a maximum value thereof (, assuming here that the higher priority bit and the higher arrival time are preferential). More specifically, the combination having the higher priority bit is first selected. When the priority bits are the same, the combination having the higher arrival time is selected. And the coincidence detection circuits 303a, 303b and 303c respectively detect a coincidence between the found maximum value and the priority bit and arrival time of each message. That is, one of the messages having the maximum priority bit and arrival time is calculated. Further, when ones of the messages have the maximum value, the priority encoder 304 encodes it to determine one of the messages to be output to the switch 102a, 102b or 103c, and then sets the number of the determined message in the register 305. The priority bit change circuit 311 changes the priority bits of the remaining messages not selected for arbitration. In the illustrated example, the priority bits of the messages once awaited are incremented at the adders 306a, 306b and 306c, for example, by +1. The arrival time of the message selected through the arbitration is selected at the selection circuit 310 according to the value of the register 305. And the comparators 309a, 309b and 309c compare the received value of the register 305 with the respective arrival times. When the arrival time of each message is larger than the arrival time of the selected message, this means that the non-selected message is awaited. With regard to the message not selected because it is lower in priority than the other messages, the associated selection circuit 308a, 308b or 308c selects the result of the associated adder 306a, 306b or 306c. The associated adder 306a, 306b or 306c adds the first-set priority bit by +1 and the result of one of the adders 306a, 306b and 306c added by +1 is set in associated one of the registers 307a, 307b and 307c. This set value becomes the priority bit when priority is next compared, so that the associated message can be selected faster because the priority bit is incremented by +1. The priority bits changed in the arbitration circuit are used only for the purpose of arbitration and thus the original priority bit attached in the message is transmitted as it is without being changed.

Meanwhile, for the purpose of sending the message received from the crossbar network 101XB-X0 to the processor 100i (PE22) as its receiver, the processor 100c (PE02) transmits the received message to the crossbar network 101XB-Y2. And like the crossbar network 101XB-X0, the crossbar network 101XB-Y2 determines at its crossbar network control circuit its transmission destination and sends the message received from the processor 100c (PE02) to the processor 100i (PE22).

The exemplary operation of the arbitration circuit 105 will be explained in connection with the case where messages are transmitted from 4 processors PE0, PE1, PE2 and PE3 to a processor PEn, by referring to FIGS. 4 to 6. FIG. 4 shows an arbitration result based on arrival order. When the messages have the same arrival time, the message having the higher priority bit is selected. When the messages have the same priority bit, the message selection is carried out on a fixed priority basis. FIG. 5 shows an arbitration method used in the present embodiment, that is, shows an arbitration result when the message is awaited but not changed in its priority bit. FIG. 6 shows an arbitration method used in the present embodiment, that is, shows an arbitration result when the priority bit of the message awaited is incremented by +1. In either case, arbitration is carried out 4 times and the selected message is enclosed by a bold-line rectangle. It is assumed that the processor PE3 issues a transmission request at the time of the second arbitration. In FIG. 4, the messages received from the processors PE1, PE0, PE2 and PE3 are selected in this order. In the case where the arrival order is preferential, even the message having a higher priority bit will be awaited if the message reaches later than the message having a lower priority bit. This means that, even when the message is required to be transmitted as soon as possible in case of emergency, the message have to be awaited. In the case of FIG. 5, the messages received from the processors PE0, PE3, PE2 and PE1 are selected in this order. In this case, since the awaited messages are not changed in their priority bit, the arbitration is carried out based on the initially set values. More specifically, even when the arrival time of the message is received later than the other messages, for example, like the message from the processor PE3, this message is first selected because of its higher priority bit. For this reason, when the previously-set priority bit of the message is low, the message may be awaited for a long time even when the message reaches faster than the other messages. In the case of FIG. 6, meanwhile, the messages issued from the processors PE0, PE2, PE1 and PE3 are selected in this order. In the second arbitration, the priority bits of the processors PE1 and PE2 awaited in the first arbitration are incremented by +1 respectively, which results in that the processor PE2 is first selected. Even in the third arbitration, since the priority bit of the processor PE1 is incremented by +1, the processor PE1 is selected. And in the fourth arbitration, the processor PE3 later received is selected. In other words, since the priority bit of each message is incremented each time the message is awaited, even when the initially-set priority bit of the message is low, the message will not be awaited so long.

As has been explained in the foregoing, since comparison is carried out at one time with respect to the arrival time and priority bit to calculate a maximum value, high speed arbitration can be realized. Further, since the priority bit of the message awaited is incremented by +1, the awaited message can be soon selected in the next arbitration.

Modifications (1) When it is desired to replace the change of the priority bit by the change of the arrival time of the message in the embodiment to increase a selection possibility in the next arbitration; this can be realized easily by providing the adders 306a, 306b, 306c, registers 307a, 307b, 307c, and selection circuits 308a, 308b, 308c as in the case of the change of the priority bit.

(2) When it is desired to also change the arrival time in the embodiment to increase a selection possibility in the next arbitration; this can be easily realized by providing the adders 306a, 306b, 306c, registers 307a, 307b, 307c, and selection circuits 308a, 308b, 308c, in addition to the priority bit change circuit, as in the case of the change of the priority bit.

(3) When it is desired to provide the priority bit changed in the arbitration circuit as a new priority bit to the message in the embodiment to be preferentially handled in the next-stage crossbar network; this can be realized by selecting the values of the registers 307a, 307b and 307c of the priority bit change circuit 311 on the basis of the value of the register 305 and then providing it to the message.

(4) When it is desired to also change the arrival time to increase a selection possibility in the next arbitration in the modification (3); this can be easily realized by providing the adders 306a, 306b, 306c, registers 307a, 307b, 307c, and selection circuits 308a, 308b, 308c, in addition to the priority bit change circuit, as in the case of the change of the priority bit.

(5) When it is desired that, in the embodiment, the arbitration is based on arrival order, selection of one of messages having the same arrival time is determined by the higher priority bit in the messages, selection of one of the messages having the same arrival time and the same priority bit is determined by a previously-set fixed priority; this can be realized by using the values of the registers 301a, 301b, 301c as upper digits and using the values of the registers 307a, 307b, 307c as lower digits and by applying them to the maximum value calculation circuit 302 to find a maximum value.

(6) When it is desired to employ the same arbitration method as in the modification (5) and to change the arrival times of the awaited messages in the embodiment to increase a selection possibility in the next arbitration; this can be realized easily by providing the adders 306a, 306b, 306c, registers 307a, 307b, 307c, and selection circuits 308a, 308b, 308c as in the case of the change of the priority bit.

(7) When it is desired to also change the arrival time in the modification (5) to increase a selection possibility in the next arbitration; this can be easily realized by providing the adders 306a, 306b, 306c, registers 307a, 307b, 307c, and selection circuits 308a, 308b, 308c, in addition to the priority bit change circuit, as in the case of the change of the priority bit.

(8) When it is desired to employ the same arbitration method as in the modification (5) and to provide the priority bit changed in the arbitration circuit as a new priority bit to the message in the embodiment to be preferentially handled in the next-stage crossbar network; this can be realized by selecting the values of the registers 307a, 307b and 307c of the priority bit change circuit 311 on the basis of the value of the register 305 and providing it to the message.

(9) When it is desired to also change the arrival time to increase a selection possibility in the next arbitration in the modification (8); this can be easily realized by providing the adders 306a, 306b, 306c, registers 307a, 307b, 307c, and selection circuits 308a, 308b, 308c, in addition to the priority bit change circuit, as in the case of the change of the priority bit.

(10) When it is desired to count the number of awaited times of each message and to reflect the counted value on the arbitration of the next-stage crossbar network; the awaited frequency is transmitted together with its message and merged in the upper bit of the maximum value calculation circuit in the arbitration circuit for arbitration. The above method for counting the awaited message frequency can be realized, for example, by providing the comparators 309a, 309b, 309c and selection circuit 310 for detection of the awaited message, by providing the adders 306a, 306b, 306c and registers 307a, 307b, 307c for counting the number of awaited times of each message, by providing selection circuits to outputs of the adders 306a, 306b, 306c to select the outputs on the basis of the value of the register 305, and then by transmitting the selected value together with the associated message.

What is claimed is:

1. An arbitration circuit for selecting one of a plurality of request signals, comprising:

an information generation circuit responsive to the arrival of each of request signals at said arbitration circuit for generating arrival-order-related information for use in discrimination of an order of arrival times of the request signals;

a selection circuit for selecting one of said plurality of request signals based on a combination of priority which is predetermined for each request signal and said arrival order information generated for each request signal;

wherein said selection circuit comprises a circuit which selects one of said plurality of request signals on the basis of said combinations in such a manner that when a total number of request signals which has a highest priority among the request signals is one, then that one request signal of the highest priority is selected and when a total number of request signals which has a highest priority among the request signals is plural, one of plural highest priority request signals which arrived at said arbitration circuit earliest is selected; and wherein said arbitration circuit further comprises an order change circuit responsive to selection of one of the request signals by said selection circuit for changing an arrival-order-related information generated for at least another one of the request signals which has not been selected by said selection circuit to one indicative of an earlier arrival order for use in later arbitration by said arbitration circuit, wherein said another request signal is one which is earlier in the arrival order than said selected request.

2. An arbitration circuit as set forth in claim 1, wherein said arrival-order-related information generated for each request signal is information indicative of a timing of arrival of said each request signal at said arbitration circuit.

3. An arbitration circuit for selecting one of a plurality of request signals, comprising:

an information generation circuit responsive to the arrival of each of request signals at said arbitration circuit, for generating arrival-order-related information for use in discrimination of an order of arrival times of the request signals;

a selection circuit for selecting one of said plurality of request signals based on a combination of priority which is predetermined for each request signal and said arrival order information generated for each request signal;

wherein said selection circuit comprises a circuit which selects one of said plurality of request signals on the basis of said combinations in such a manner that when a total number of request signals which has a highest priority among the request signals is one, then that one request signal of the highest priority is selected and when a total number of request signals which has a highest priority among the request signals is plural, one of plural highest priority request signals which arrived at said arbitration circuit earliest is selected; and wherein said arbitration circuit, further comprises a change circuit responsive to selection of one of request signals by said selection circuit for changing a priority and arrival order information of at least another of the request signals which has not been selected to a higher priority and to arrival-order-related information indicative of an earlier arrival order for use in later arbitration by said arbitration circuit, wherein said another request signal is one which is earlier than the one selected request signal in the arrival order.

4. An arbitration circuit as set forth in claim 3, wherein said arbitration circuit further comprises an output circuit responsive to selection of said another request signal at later arbitration by said arbitration circuit, for outputting said another request together with the priority information indicative of the old priority predetermined for the another request signal before changing of the priority by said change circuit.

5. A data processor system comprising:
   (a) a plurality of processors;
   (b) a switching network for mutually interconnecting said plurality of processors therethrough,
   (c) wherein each of said processors has means for transmitting a message to said switching network together with priority information indicative of priority of the message;
   (d) wherein said switching network has;
   ($d_1$) transmission paths for transmitting therethrough a plurality of messages sent from said plurality of processors to respectively designated processors, and
   ($d_2$) a plurality of arbitration circuits provided at different parts of said transmission paths for receiving the plurality of messages from the different transmission paths and for selecting one of the plurality of messages to be output to the associated paths,
   (e) wherein each of said plurality of arbitration circuits has;
   ($e_1$) an information generation circuit responsive to arrival of each of a plurality of messages arriving at said each arbitration circuit, for generating arrival-order-related information for use in discrimination of an order of arrival times of the messages, and
   ($e_2$) a selection circuit for selecting one of said plurality of messages on the basis of a combination of priority information attached to each of the messages and said arrival-order-related information generated for said each message;
   wherein said selection circuit comprises a circuit which selects one of said plurality of request signals on the basis of said combinations in such a manner that when a total number of request signals which has a highest priority among the request signals is one, than that one request signal of the highest priority is selected and when a total number of request signals which has a highest priority among the request signals is plural, one of plural highest priority request signals which has arrived at said arbitration circuit earliest is selected; and
   wherein said data processor system further comprises an order change circuit responsive to selection of one of the request signals by said selection circuit for changing an arrival-order-related information generated for at least another one of the request signals which has not been selected by said selection circuit to one indicative of an earlier arrival order for use in later arbitration by said arbitration circuit, wherein said another request signal is one which is earlier in the arrival order than said selected request.

6. A data processor system as set forth in claim 5, wherein said arrival-order-related information generated for each request signal is information indicative of a timing of arrival of said each request signal at said arbitration circuit.

7. A data processor system comprising:
   (a) a plurality of processors;
   (b) a switching network for mutually interconnecting said plurality of processors therethrough,
   (c) wherein each of said processors has means for transmitting a message to said switching network together with priority information indicative of priority of the message;
   (d) wherein said switching network has;
   ($d_1$) transmission paths for transmitting therethrough a plurality of messages sent from said plurality of processors to respectively designated processors, and
   ($d_2$) a plurality of arbitration circuits provided at different parts of said transmission paths for receiving the plurality of messages from the different transmission paths and for selecting one of the plurality of messages to be output to the associated paths,
   (e) wherein each of said plurality of arbitration circuits has;
   ($e_1$) an information generation circuit responsive to arrival of each of a plurality of messages arriving at said each arbitration circuit, for generating arrival-order-related information for use in discrimination of an order of arrival times of the messages, and
   ($e_2$) a selection circuit for selecting one of said plurality of messages on the basis of a combination of priority information attached to each of the messages and said arrival-order-related information generated for said each message;
   wherein said selection circuit comprises a circuit which selects one of said plurality of request signals on the basis of said combinations in such a manner that when a total number of request signals which has a highest priority among the request signals is one, than that one request signal of the highest priority is selected and when a total number of request signals which has a highest priority among the request signals is plural, one of plural highest priority request signals which has arrived at said arbitration circuit earliest is selected; and
   wherein said data processor system further comprises a change circuit responsive to selection of one of request signals by said selection circuit for changing a priority and arrival order information of at least another of the request signals which has not been selected to a higher priority and to arrival-order-related information indicative of an earlier arrival order for use in later arbitration by said arbitration circuit, wherein said another request signal is one which is earlier than the one selected request signal in the arrival order.

8. A data processor system as set forth in claim 7, wherein said arbitration circuit further comprises an output circuit responsive to selection of said another request signal at later arbitration by said arbitration circuit, for outputting said another request together with the priority information indicative of the old priority predetermined for the another request signal before changing of the priority by said change circuit.

* * * * *